United States Patent
Yamada et al.

(10) Patent No.: US 8,335,396 B2
(45) Date of Patent: Dec. 18, 2012

(54) IMAGE OUTPUT APPARATUS, EDGE ENHANCEMENT METHOD, AND RECORDING MEDIUM

(75) Inventors: Kohji Yamada, Kawasaki (JP); Mari Iwasaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 12/726,502

(22) Filed: Mar. 18, 2010

(65) Prior Publication Data

US 2010/0239173 A1    Sep. 23, 2010

(30) Foreign Application Priority Data

Mar. 19, 2009  (JP) .................................. 2009-069145

(51) Int. Cl.
*G06K 9/40* (2006.01)
*H04N 1/407* (2006.01)

(52) U.S. Cl. ...................... 382/266; 358/3.27

(58) Field of Classification Search .................. 382/199, 382/254, 260, 263, 266–269, 274, 275, 312; 358/532, 3.27, 463; 348/278, 285
See application file for complete search history.

(56) References Cited

U.S. PATENT DOCUMENTS

| | | | | |
|---|---|---|---|---|
| 5,961,461 A | * | 10/1999 | Mo et al. | 600/443 |
| 6,950,211 B2 | * | 9/2005 | Trifonov et al. | 358/3.26 |
| 7,050,651 B2 | * | 5/2006 | Zaklika et al. | 382/275 |
| 7,639,891 B2 | * | 12/2009 | Loce et al. | 382/266 |
| 7,817,875 B2 | * | 10/2010 | Michel et al. | 382/274 |
| 8,165,385 B2 | * | 4/2012 | Reeves et al. | 382/154 |
| 2008/0037898 A1 | | 2/2008 | Nakagata | |

FOREIGN PATENT DOCUMENTS

| | | |
|---|---|---|
| JP | 2000-295496 A | 10/2000 |
| JP | 2003-032514 A | 1/2003 |
| JP | 2004-172815 A | 6/2004 |
| JP | 2008-047950 A | 2/2008 |

* cited by examiner

*Primary Examiner* — Kanjibhai Patel
(74) *Attorney, Agent, or Firm* — Fujitsu Patent Center

(57) ABSTRACT

An image output apparatus includes an addition amount calculation unit that calculates, based on a target pixel and each of adjacent pixels before and after the target pixel in an input image, an edge enhancement addition amount to be added to a pixel value of the target pixel; a variation calculation unit that calculates a linear variation in accordance with a shape of an edge gradient formed by the target pixel and each of the adjacent pixels; a weight processing unit that assigns a weight to the edge enhancement addition amount in accordance with the linear variation; and an addition amount addition unit that adds the weighted edge enhancement addition amount to the pixel value of the target pixel and outputs the added pixel value.

12 Claims, 15 Drawing Sheets

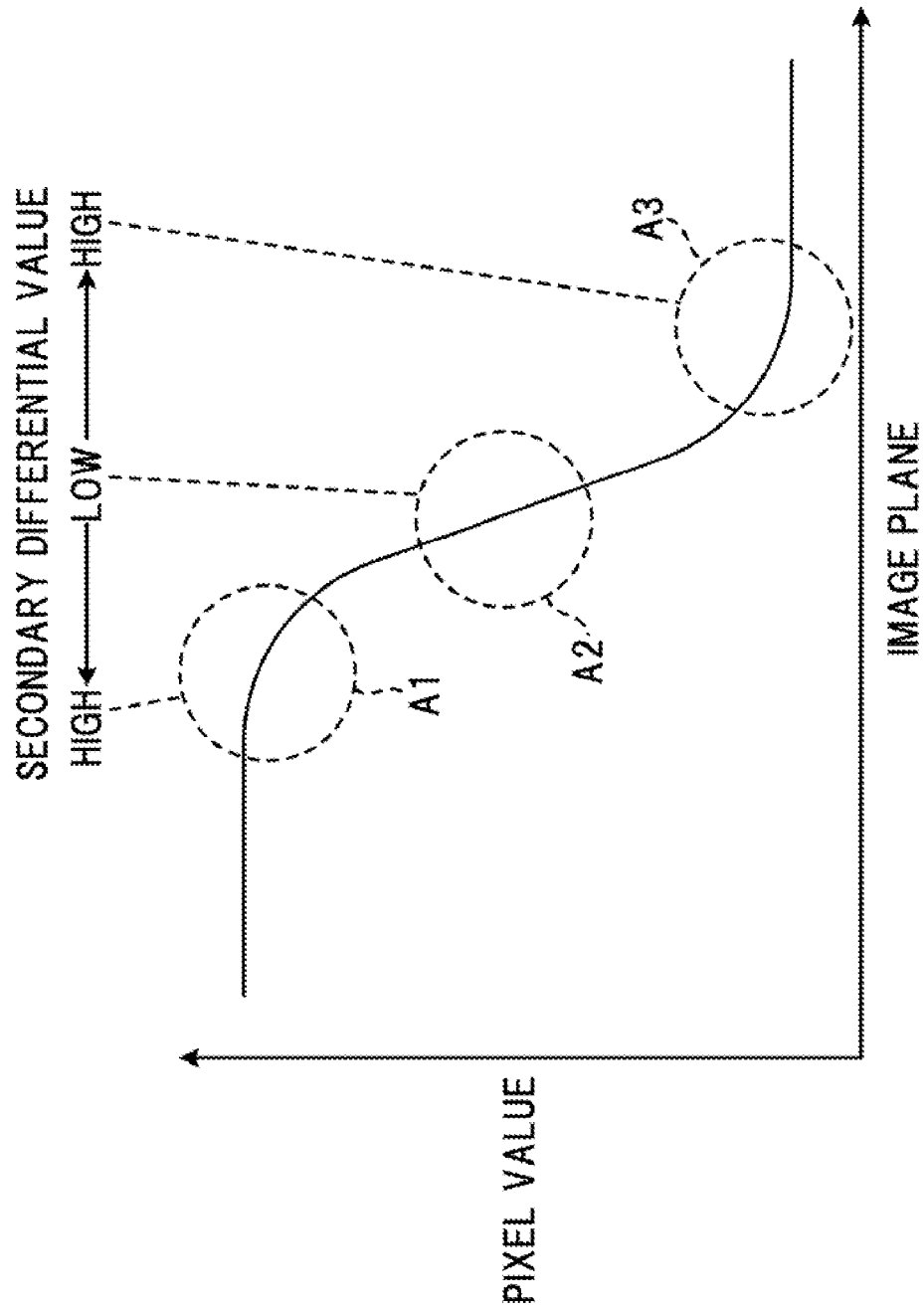

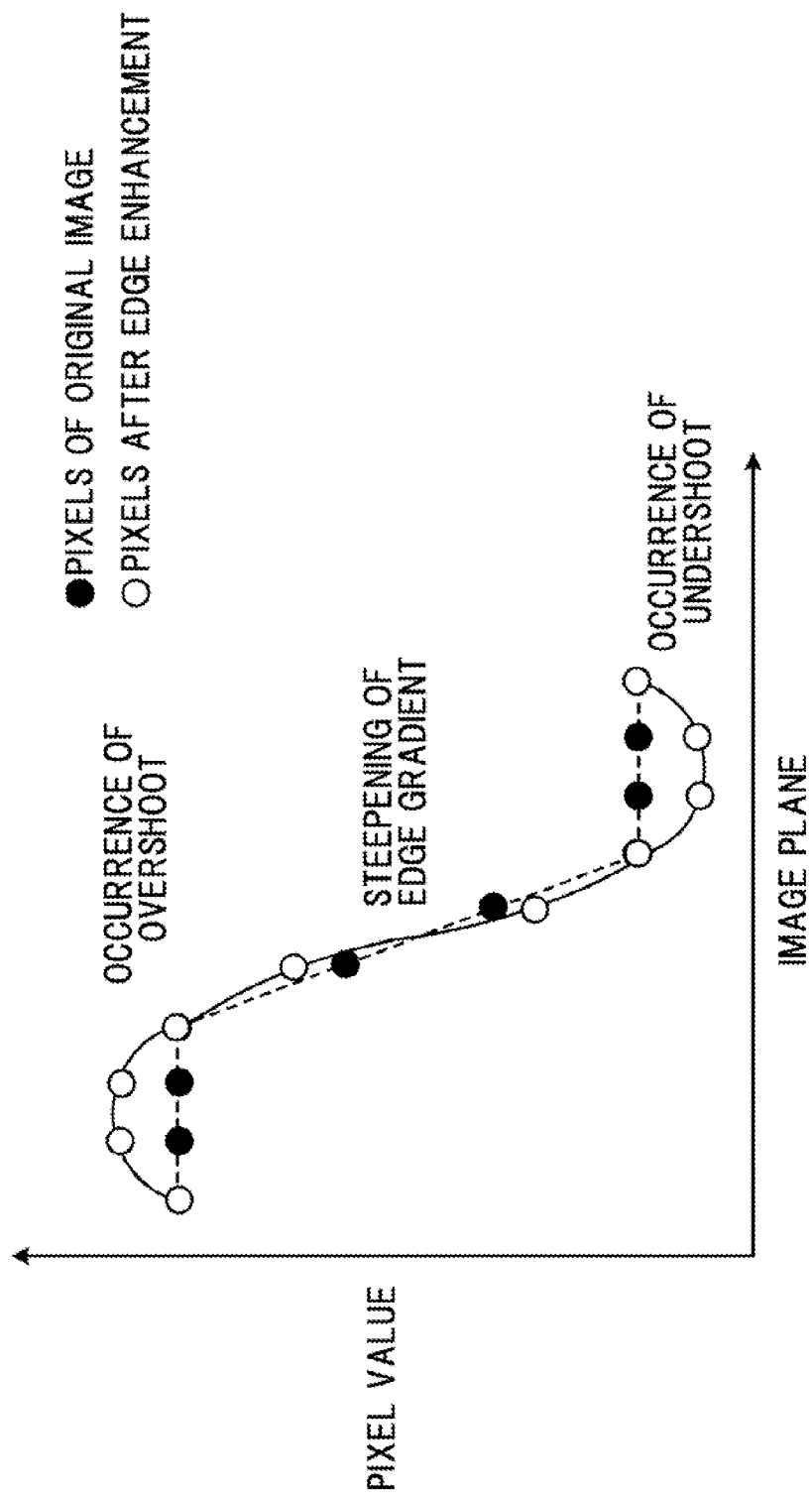

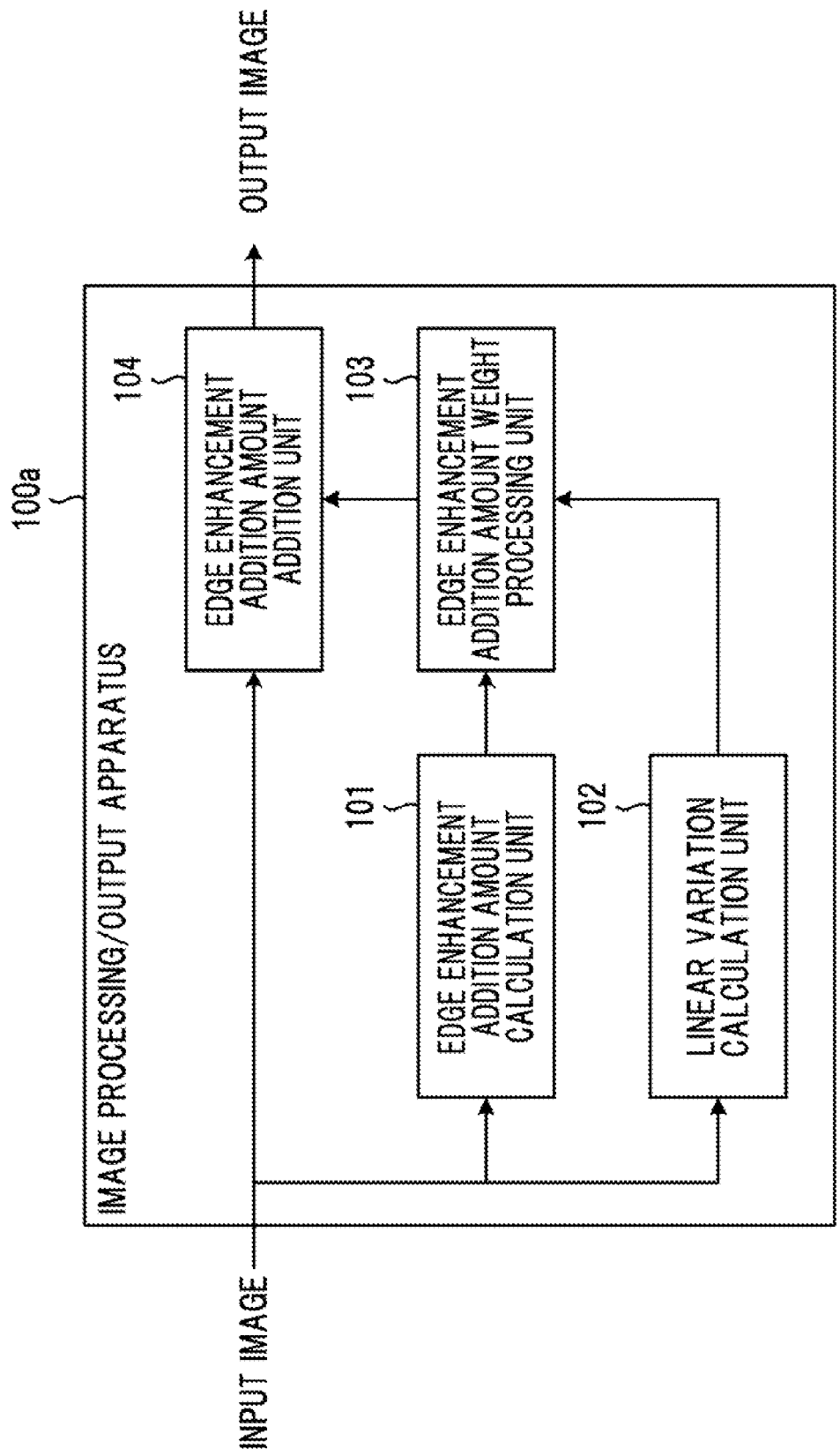

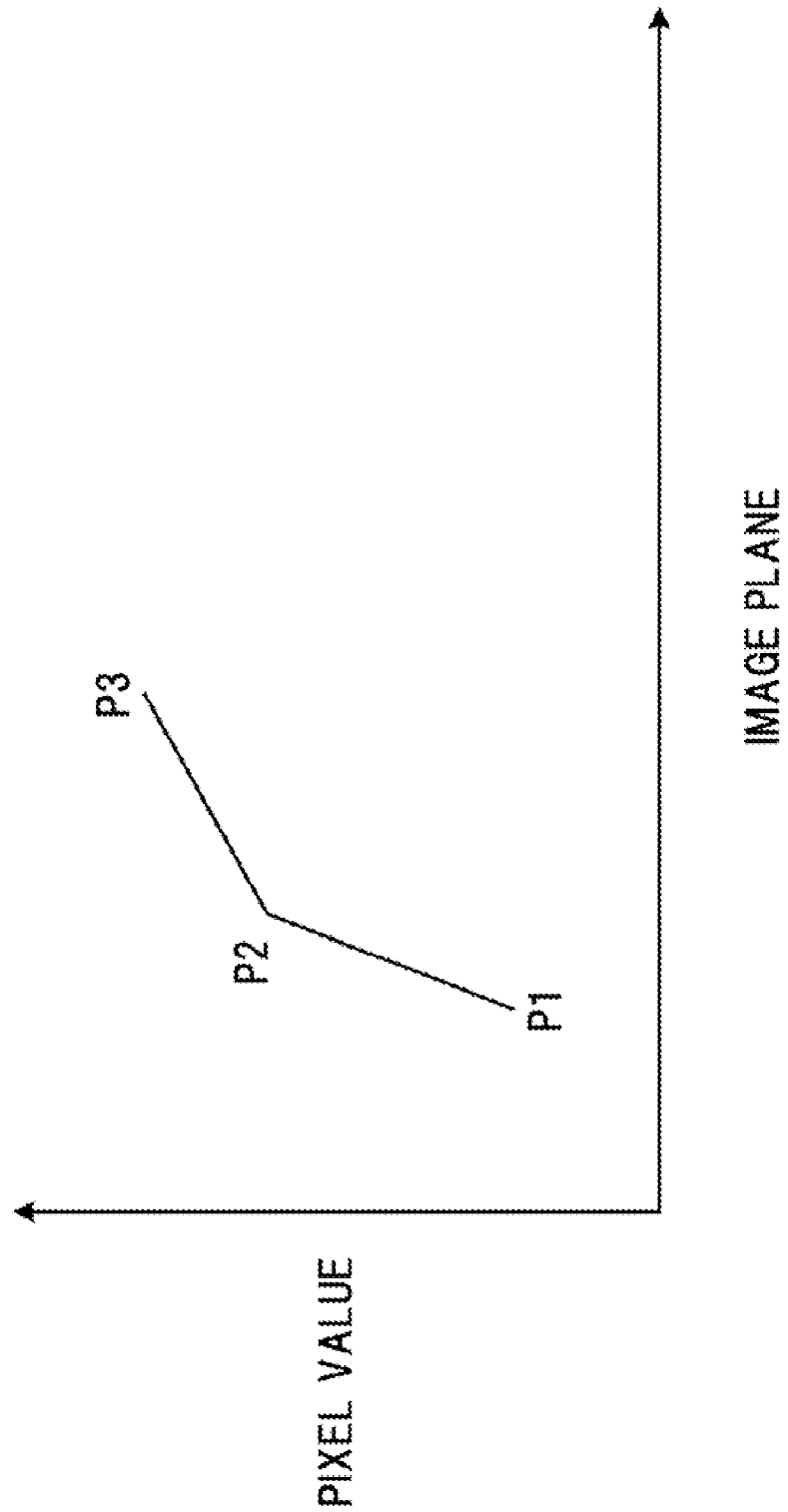

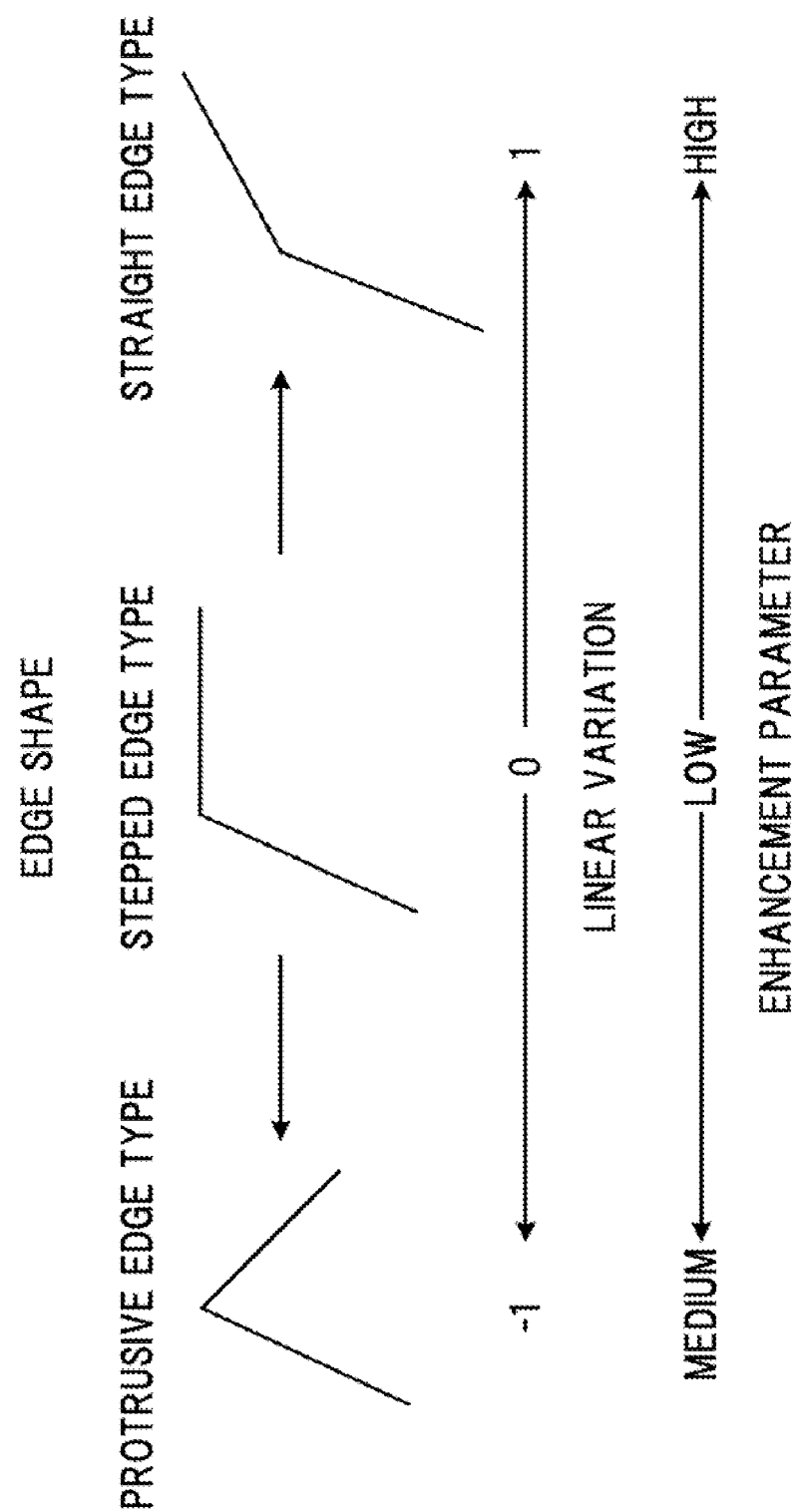

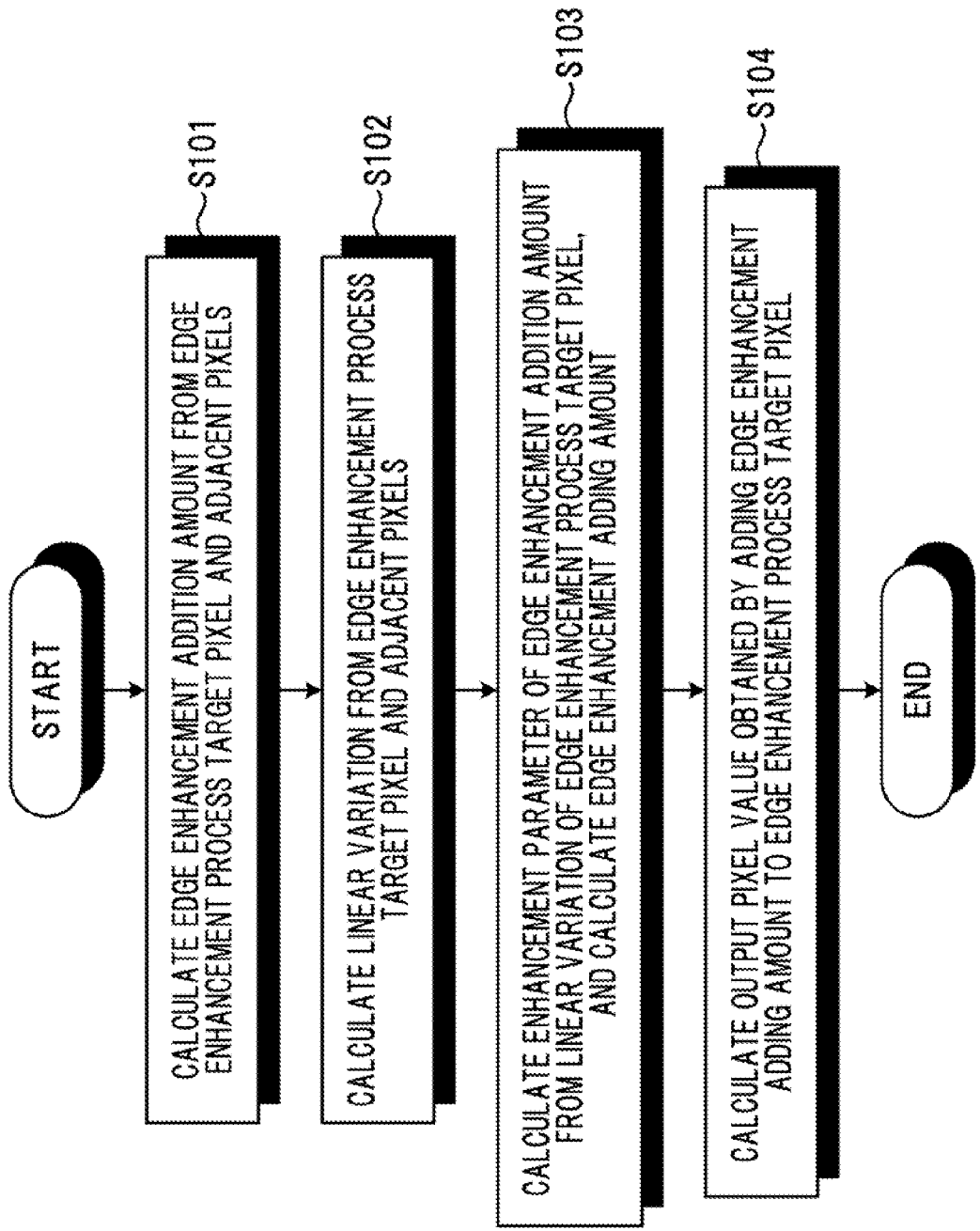

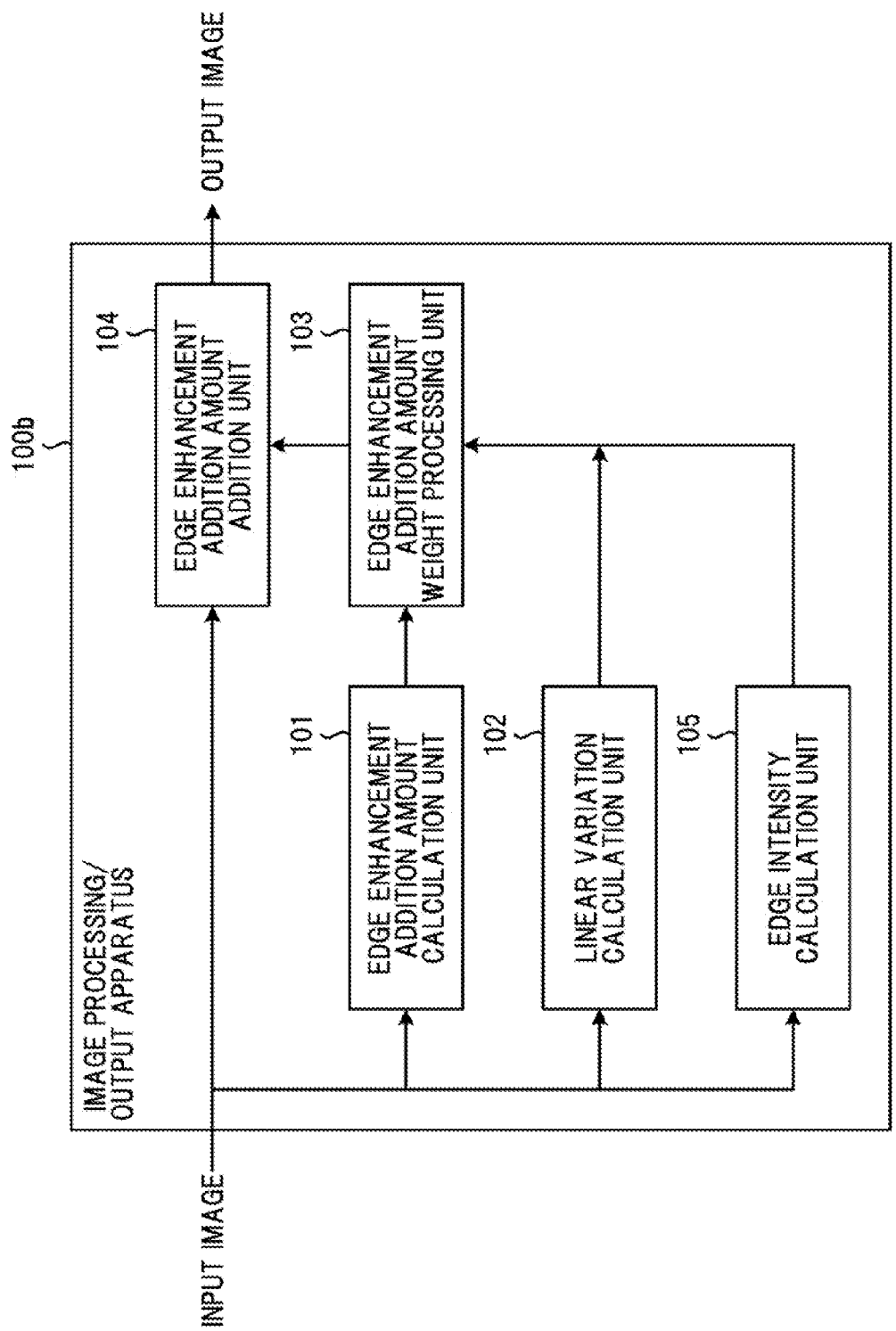

FIG. 13A

| -1 | 1 | 0 |
|---|---|---|

FIG. 13B

| 0 | -1 | 1 |
|---|---|---|

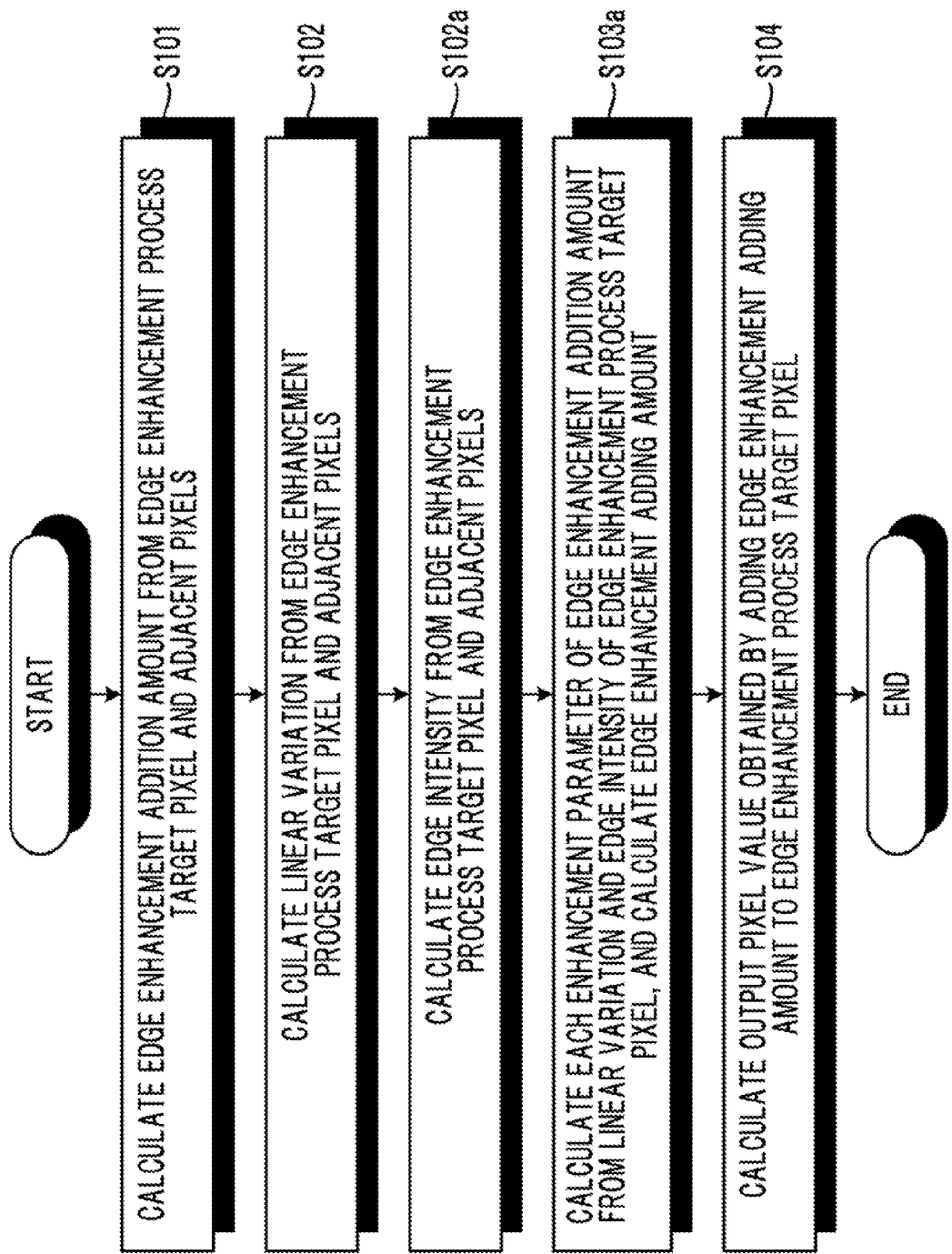

IMAGE OUTPUT APPARATUS, EDGE ENHANCEMENT METHOD, AND RECORDING MEDIUM

CROSS-REFERENCE TO RELATED APPLICATIONS

This application is based upon and claims the benefit of priority from the prior Japanese Patent Application No. 2009-69145 filed on Mar. 19, 2009, the entire contents of which are incorporated herein by reference.

FIELD

Embodiments described herein relate to an image output apparatus, an edge enhancement method, and a recording medium having recorded therein a program that executes the method.

BACKGROUND

Generally, in image processing, in order to enhance the sharpness of an image, an edge that is the boundary between image parts located within the image (the edge of the image part) is detected, and an edge enhancement process is performed in accordance with the shape of the edge (e.g., a stepped edge type, a protrusive edge type, a straight edge type, and the like).

For example, as in Japanese Laid-open Patent Publication No. 2000-295496, it is known that the secondary differential value of the pixel value of an edge enhancement process target pixel is calculated and added to the pixel value of the edge enhancement process target pixel, thereby enhancing the sharpness of an image. In this existing art, at the edge part, the luminance of the pixel changes greatly. Thus, in the edge, the secondary differential value is low at the center of the edge, but the secondary differential value is great at an end of the edge (a top or a bottom of a protrusive edge).

Further, for example, as in Japanese Laid-open Patent Publication No. 2004-172815, it is known that a pixel value is obtained by: calculating a secondary differential value from the pixel values of pixels that are before and after an edge enhancement process target pixel and are distant from the edge enhancement process target pixel by two pixels; adding the secondary differential value to the pixel value of the target pixel, and a median filter process is performed on the three pixels including the two pixels before and after the edge enhancement process target pixel.

Further, for example, as in Japanese Laid-open Patent Publication No. 2008-047950, it is known that, in order to suppress overshoot at an end of an edge, the maximum value and the minimum value of the values of pixels in filter taps are calculated, and control is performed such that a pixel value obtained by subtracting a secondary differential value from the pixel value of an edge enhancement process target pixel does not exceed the above maximum value and does not fall below the above minimum value. It is noted that the number of the taps is the number of multipliers each of which multiplies the number of pixels that are to be processed by a filter, by a filter coefficient.

Further, for example, as in Japanese Laid-open Patent Publication No. 2003-32514, it is known that the primary differential value of the pixel value of an edge enhancement process target pixel is compared to a threshold to recognize a part where a pixel value changes like a mountain or a valley, and a pixel at the top and a pixel at the bottom are detected. Thus, Edge enhancement is performed by adding a correction value to the pixel value of the peak pixel detected, and subtracting a correction value from the pixel value of the bottom pixel detected.

SUMMARY

According to an embodiment, an image output apparatus includes an addition amount calculation unit that calculates, based on a target pixel and each of adjacent pixels before and after the target pixel in an input image, an edge enhancement addition amount to be added to a pixel value of the target pixel; a variation calculation unit that calculates a linear variation in accordance with a shape of an edge gradient formed by the target pixel and each of the adjacent pixels; a weight processing unit that assigns a weight to the edge enhancement addition amount in accordance with the linear variation; and an addition amount addition unit that adds the weighted edge enhancement addition amount to the pixel value of the target pixel and outputs the added pixel value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a view illustrating a state of a secondary differential value corresponding to a pixel value;

FIG. 3 is a view illustrating a related art;

FIG. 6 is a block diagram illustrating a configuration of an image processing/output apparatus according to a first embodiment;

FIG. 8 is a diagram for explaining a calculation method of a linear variation;

FIG. 9 illustrates the relation among an edge shape, a linear variation, and an enhancement parameter;

FIG. 11 is a flow chart illustrating a procedure of image processing according to the first embodiment;

FIG. 12 is a block diagram illustrating a configuration of an image processing/output apparatus according to a second embodiment;

FIG. 13A illustrates an example of an edge intensity calculation filter;

FIG. 13B illustrates another example of the edge intensity calculation filter (Part 2);

FIG. 15 is a flow chart illustrating a procedure of image processing according to the second embodiment.

DETAILED DESCRIPTION OF THE EMBODIMENTS

Hereinafter, embodiments of an image output apparatus, an edge enhancement apparatus, and an edge enhancement method, which are disclosed by the present application, will be described in detail with reference to the drawings. It is noted that, in the following embodiments, an edge enhancement addition amount is defined as the secondary differential value of an edge enhancement process target pixel. However, the edge enhancement addition amount is not limited to the secondary differential value of the edge enhancement process target pixel. In addition, the art disclosed by the present application is not limited by the following embodiments.

Examples of the image output apparatus disclosed in the embodiments of the present application include: an image display device such as a television receiver and a display having an image display screen; an image print device such as a printer that outputs and prints an image on a medium such as paper; a picture recording device that captures an image of a broadcast program; an imaging device that captures a subject as an image; and the like.

The edge enhancement apparatus disclosed in the embodiments of the present application is included in the above image output apparatus examples, and is a circuit apparatus that performs image processing for enhancing the sharpness of an image outputted by the image output apparatus. The edge enhancement method disclosed in the embodiments of the present application is a process performed by the edge enhancement apparatus.

The image output apparatus, the edge enhancement apparatus, and the edge enhancement method sequentially perform image processing on an image with a group of pixels in one row, among pixels arranged in a matrix, as one unit. The image part formed by a group of pixels in one row is generally referred to as a scanning line. In other words, an image is inputted or outputted per scanning line in the image output apparatus and the edge enhancement apparatus, and hence pixels adjacent to an edge enhancement process target pixel refers to pixels before and after the edge enhancement process target pixel on the same scanning line as the edge enhancement process target pixel. However, the pixels adjacent to the edge enhancement process target pixel are not limited to the pixels before and after the edge enhancement process target pixel on the same scanning line as the edge enhancement process target pixel.

Figure 1A:
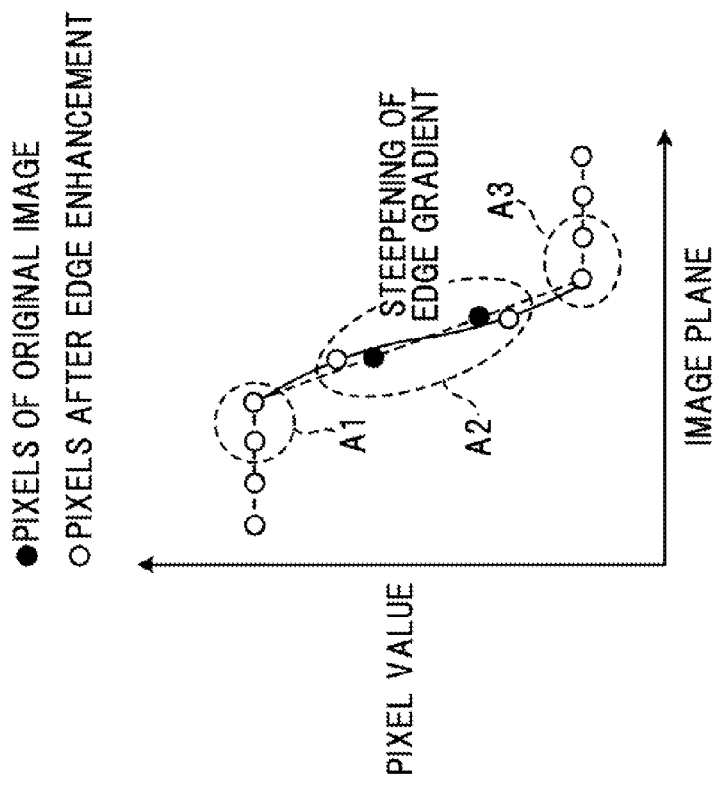
FIGS. 1A and 1B are views for explaining an outline of embodiments.
Figure 1B:
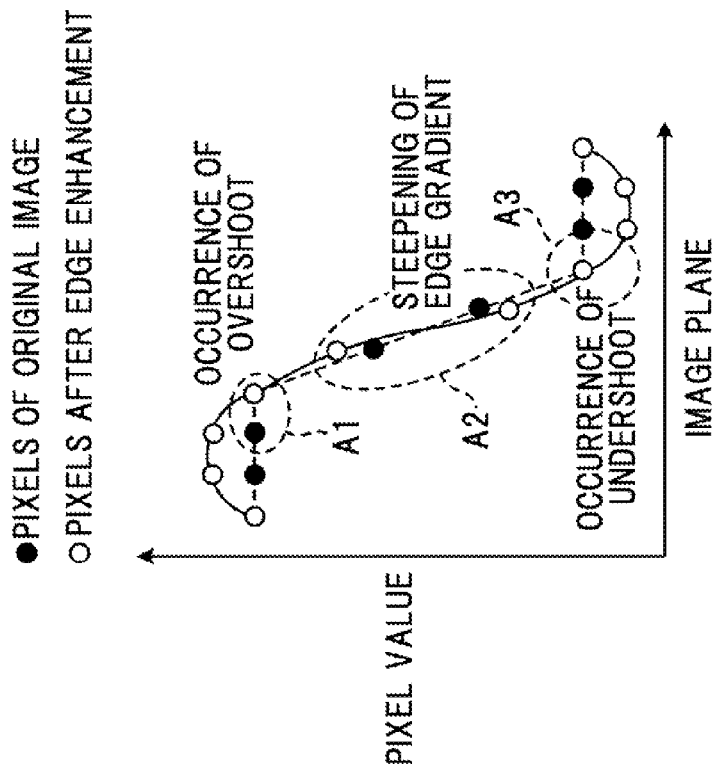

First, an outline of the embodiments disclosed by the present application will be described in comparison to related arts, prior to description of each embodiment. FIGS. 1A and 1B show the outline of the embodiments. FIG. 1A illustrates a related art, and FIG. 1B illustrates the embodiments of the present application. As illustrated in FIG. 1A, in the related art, in order to improve the sharpness of an image, a secondary differential value for steepening the edge gradient of an image part A2 is added to or subtracted from the pixel value of an edge enhancement process target pixel. It is noted that the pixel value may be a luminance. In this case, secondary differential values that are added to or subtracted from the pixel values of edge enhancement process target pixels at image parts A1 and A3, which are calculated by the same processing procedure, are relatively great. Thus, overshoot and undershoot occur as illustrated in the drawing.

However, according to the embodiments of the present application, even when the secondary differential value for steepening the edge gradient of the image part A2 is subtracted from the pixel value of the edge enhancement process target pixel, overshoot and undershoot do not occur around the edge enhancement process target pixels at the image parts A1 and A3 as illustrated in FIG. 1B.

FIG. 2 illustrates a state of a secondary differential value corresponding to a pixel value. It is assumed that, when focusing on one scanning line on an image plane, a change of the pixel value is as illustrated in FIG. 2. In this case, at image parts A1 and A3, the gradients of the pixel values of edge enhancement process target pixels change greatly, and hence the corresponding secondary differential values are relatively great. On the other hand, at an image part A2, the gradient of the pixel value of an edge enhancement process target pixel changes slightly, and hence the corresponding secondary differential value is small.

FIG. 3 illustrates a related art. Under the situation as illustrated in FIG. 2, for the main purpose of steepening an edge gradient, a secondary differential value is subtracted from the pixel value of each pixel by this related art. By so doing, as described above, the edge gradient is steepened, but overshoot and undershoot occur. The overshoot and the undershoot occur due to excessive pixel values or insufficient pixel values, and hence the edge of an image formed by the edge gradient of the image becomes unnatural. Therefore, in the related art, a sufficient edge enhancement effect cannot be obtained even when the edge gradient is steepened.

On the other hand, under the situation as illustrated in FIG. 2, for the main purpose of suppressing overshoot and undershoot, a secondary differential value is subtracted from the pixel value of each pixel by the related art. By so doing, occurrence of overshoot and undershoot is suppressed, but the edge gradient is not sufficiently steepened. In other words, in the related art, steepening of the edge gradient and suppression of occurrence of overshoot and undershoot have a trade-off relation, and may not be achieved at the same time.

Figure 4:
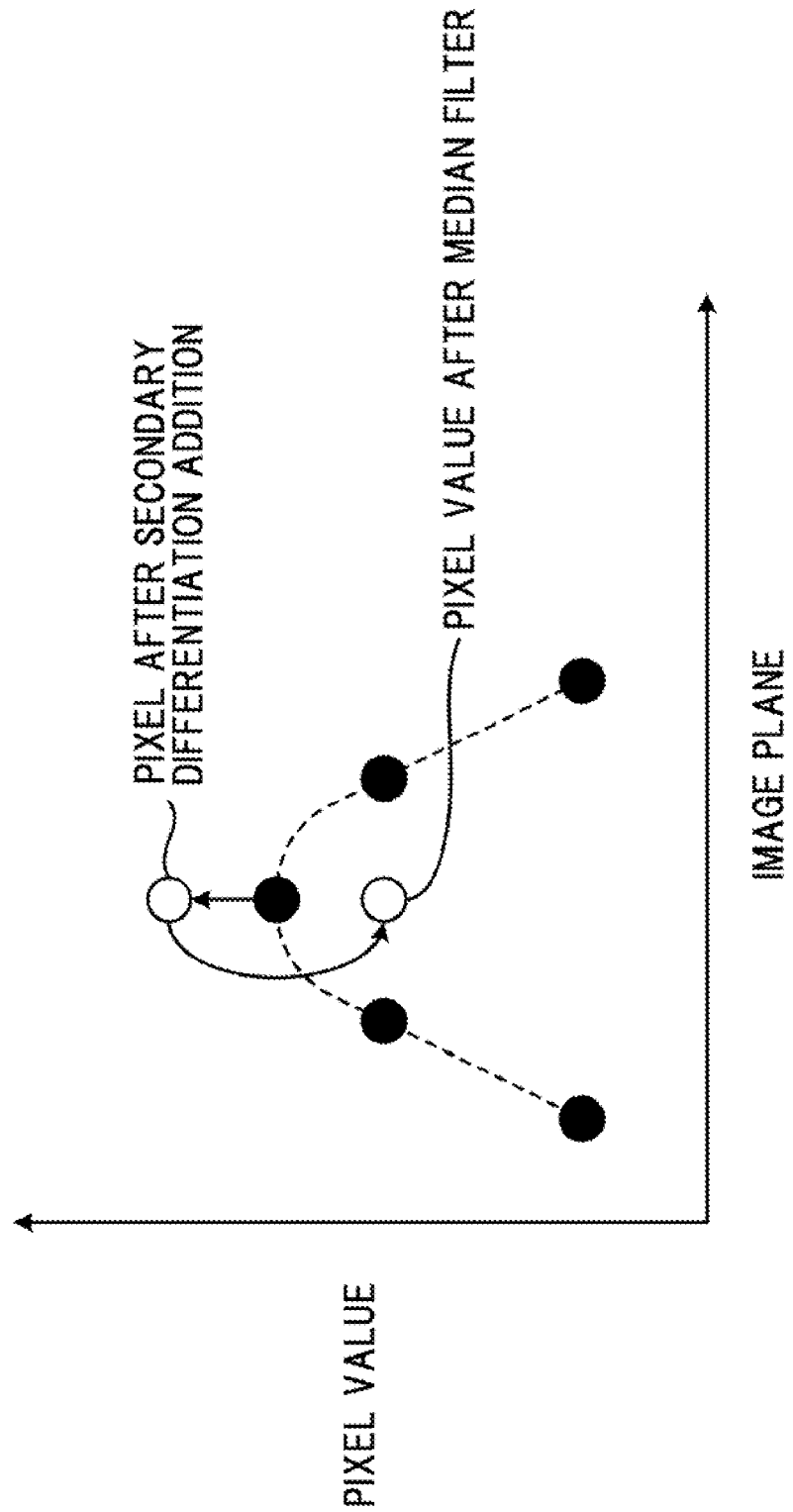
FIG. 4 is a view illustrating another related art.

For that reason, another related art has been considered, in which a suppression process of overshoot and undershoot is performed after image processing to steepen an edge gradient is performed. FIG. 4 illustrates the other related art. As illustrated in FIG. 4, in this related art, a median filter process is performed on a pixel at the top of overshoot or a pixel at the bottom of undershoot. In other words, a pixel value is subtracted from a pixel value that is excessive due to addition of a secondary differential value, or a pixel value is added to a pixel value that is insufficient due to subtraction of a secondary differential value. However, according to this method, only the pixel value of the pixel at the top of overshoot or at the bottom of undershoot, is adjusted. Thus, the pixel at the top or at the bottom, which is an edge enhancement process target pixel, is not edge-enhanced and has the same pixel value as the adjacent pixels. For that reason, in this related art, a sufficient edge enhancement effect still may not be obtained, and the sharpness may not be improved.

Figure 5:
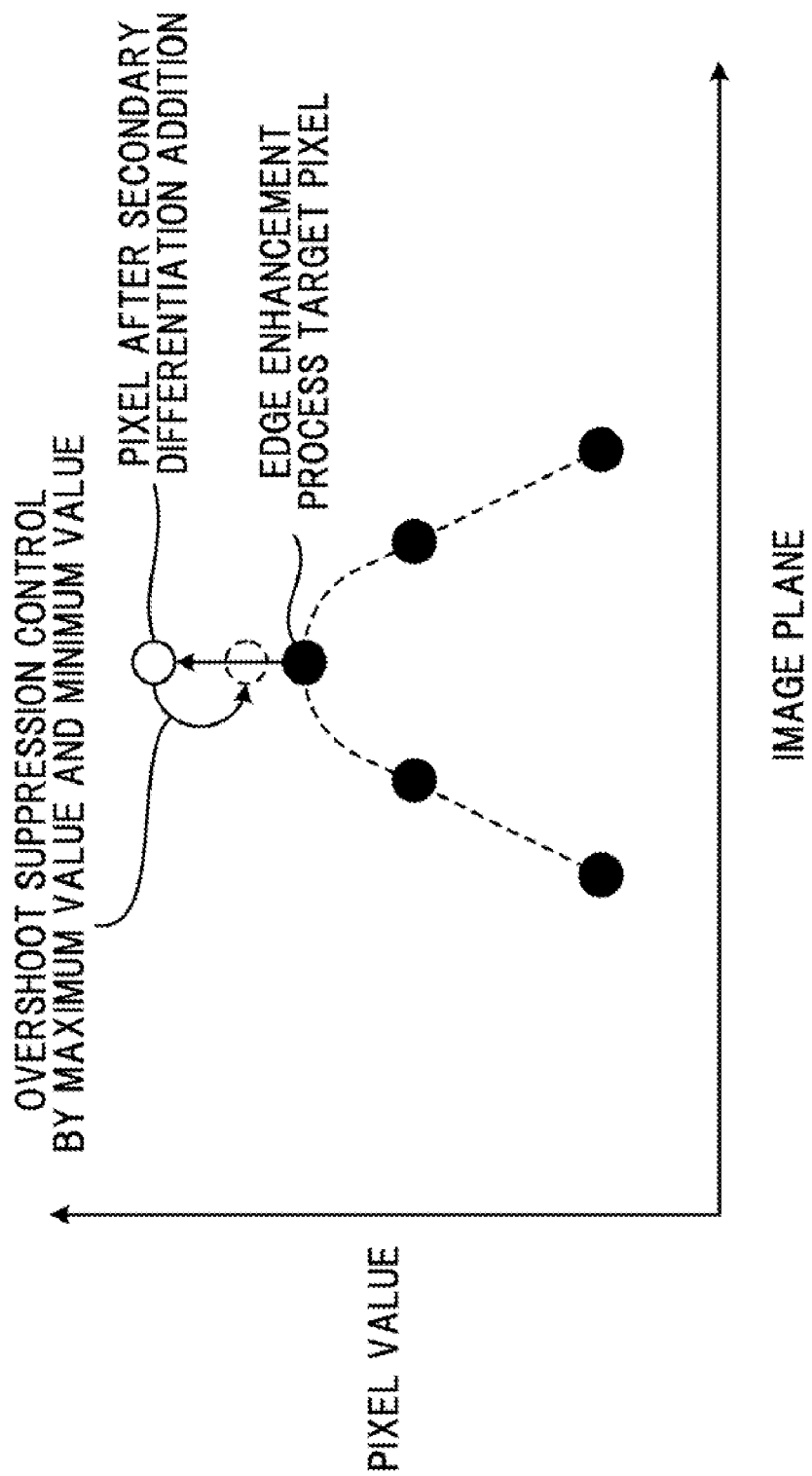
FIG. 5 is a view illustrating another related art.

Further, another related art has been considered, in which a suppression process of overshoot and undershoot is performed as follows. FIG. 5 illustrates the other related art. Specifically, in this related art, for the suppression process of overshoot and undershoot, after a secondary differential value is added to or subtracted from an edge enhancement process target pixel, the pixel value of the edge enhancement process target pixel is limited to the range from the minimum value to the maximum value of pixel values of a group of suppression target pixels. However, in this method, similarly as the above methods, the pixel at the top or at the bottom, which is the edge enhancement process target pixel, is not edge-enhanced, a sufficient edge enhancement effect still may not be obtained, and the sharpness may not be improved.

In the art disclosed in the embodiments described below, the problems of the above related arts, specifically, the problem of the trade-off between steepening of an edge gradient and suppression of occurrence of overshoot and undershoot may be overcome, both matters may be achieved at the same time, and a sharper image may be obtained.

(First Embodiment)

FIG. 6 is a block diagram illustrating a configuration of an image processing/output apparatus according to a first embodiment. It is noted that the image processing/output apparatus is a collective term for an image output apparatus and an image processor. In other words, when the image processing/output apparatus according to the first embodiment is an image output apparatus, a configuration concerning an image output is omitted therein. The same is true for a later-described second embodiment.

Referring to FIG. 6, the image processing/output apparatus 100a according to the first embodiment includes an edge enhancement addition amount calculation unit 101, a linear variation calculation unit 102, an edge enhancement addition amount weight processing unit 103, and an edge enhancement addition amount addition unit 104.

Figure 7A:
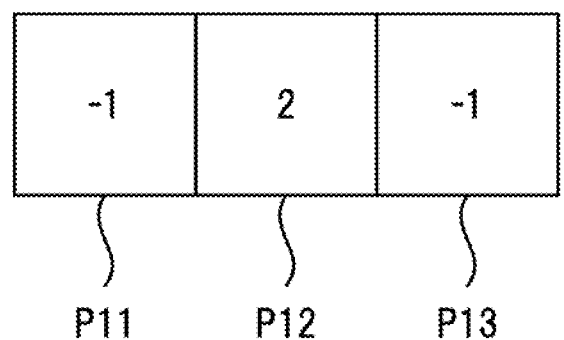
FIG. 7A illustrates an example of a secondary differential value calculation filter (3 taps)
Figure 7B:
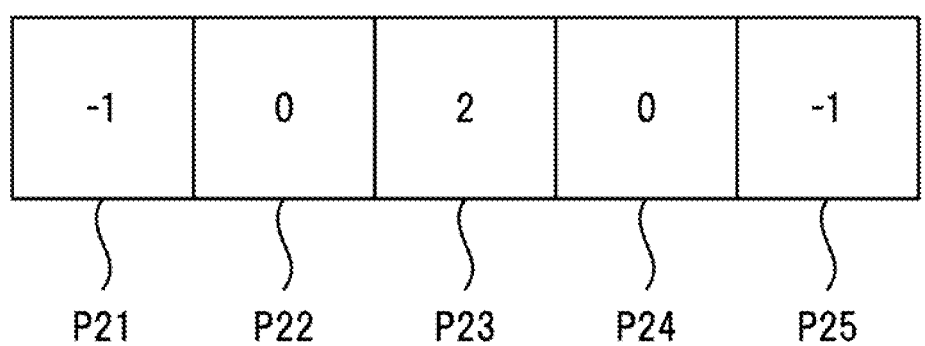
FIG. 7B illustrates another example of the secondary differential value calculation filter (5 taps)

The edge enhancement addition amount calculation unit 101 calculates a value that is obtained by inverting the positive/negative sign of a secondary differential value by a secondary differential value calculation filter illustrated in FIG. 7A or FIG. 7B, from each of the pixel values of an edge enhancement process target pixel and adjacent pixels in an input image. The edge enhancement addition amount calculation unit 101 outputs the calculated value as an edge enhancement addition amount to the edge enhancement addition amount weight processing unit 103.

The secondary differential value calculation filter illustrated in FIG. 7A is an example of a 3-tap filter. The 3-tap filter is a filter for calculating a value that is obtained by inverting the positive/negative sign of the secondary differential value of a pixel P12 that is an edge enhancement process target pixel, from the pixel P12 (pixel value=p12) that is the edge enhancement process target pixel, and from a pixel P11 (pixel value=p11) and a pixel P13 (pixel value=p13) that are adjacent to the pixel P12 and before and after the pixel P12. When the secondary differential value calculation filter illustrated in FIG. 7A is used, a value En that is obtained by inverting the positive/negative sign of the secondary differential value of the pixel P12 that is the edge enhancement process target pixel, is calculated as in Formula (1).

$$En=(-1) \times p11+2 \times p12+(-1) \times p13 \quad (1)$$

In other words, each of the pixel values p11, p12, and p13 of the pixels is multiplied by a tap coefficient corresponding to each pixel, to calculate the value En that is obtained by inverting the positive/negative sign of the secondary differential value of the pixel P12. The tap coefficients in FIG. 7A are −1 for the pixel P11, 2 for the pixel P12, and −1 for the pixel P13.

Further, the secondary differential value calculation filter illustrated in FIG. 7B is an example of a 5-tap filter. The 5-tap filter is a filter for calculating a value that is obtained by inverting the positive/negative sign of the secondary differential value of a pixel P23 that is an edge enhancement process target pixel, from the pixel P23 (pixel value=p23) that is the edge enhancement process target pixel, from two pixels (a pixel P21 (pixel value=p21) and a pixel P22 (pixel value=p22)) before the pixel P23, and from two pixels (a pixel P24 (pixel value=p24) and a pixel P25 (pixel value=p25)) after the pixel P23.

When the secondary differential value calculation filter illustrated in FIG. 7B is used, a value En3tap that is obtained by inverting the positive/negative sign of the secondary differential value of the pixel P23 that is the edge enhancement process target pixel, and a value En5tap that is obtained by inverting the positive/negative sign of the secondary differential value of the pixel P23. Here, the value En3tap is a value that is obtained by inverting the positive/negative sign of the secondary differential value of the pixel P23 and calculated by using the 5-tap filter like a 3-tap filter as illustrated in Formula (2). Further, the value En5tap is a value that is obtained by inverting the positive/negative sign of the secondary differential value of the pixel P23 and calculated by using the 5-tap filter as a 5-tap filter as illustrated in Formula (3).

$$En3tap=(-1) \times p22+2 \times p23+(-1) \times p24 \quad (2)$$

$$En5tap=(-1) \times p21+2 \times p23+(-1) \times p25 \quad (3)$$

It is noted that when the 5-tap filter is used, a final value En that is obtained by inverting the positive/negative sign of the secondary differential value is calculated based on Formulas (4) to (7). It is noted that Th is a threshold that is a suitable positive number.

$$\text{When } |En3tap| < Th, \begin{cases} En = Th & (En5tap > 0) & (4) \\ En = -Th & (En5tap < 0) & (5) \\ En = 0 & (En5tap = 0) & (6) \end{cases}$$

$$\text{When } |En3tap| < Th, En = En3tap. \quad (7)$$

The linear variation calculation unit 102 calculates a linear variation LV from each of the pixel values of the edge enhancement process target pixel and the adjacent pixels in the input image, and outputs the linear variation LV to the edge enhancement addition amount weight processing unit 103. FIG. 8 illustrates an outline of calculation of a linear variation. As illustrated in FIG. 8, where the edge enhancement process target pixel is P2 (pixel value=p2) and two adjacent pixels opposed to each other with respect to the edge enhancement process target pixel are a pixel P1 (pixel value=p1) and a pixel P3 (pixel value=p3), the linear variation LV is calculated based on Formulas (8) to (10).

$$LV = \begin{cases} \dfrac{p2 - p1}{p3 - p2} & (|p2 - p1| < |p3 - p2|) & (8) \\ \dfrac{p3 - p2}{p2 - p1} & (|p2 - p1| > |p3 - p2|) & (9) \\ 0 & (|p2 - p1| = |p3 - p2|) & (10) \end{cases}$$

FIG. 9 illustrates an outline of the relation among an edge shape, a linear variation, and a weighting amount for an edge enhancement addition amount. According to FIG. 9, the linear variation becomes a value close to −1 for a protrusive edge type, becomes a value close to 0 for a stepped edge type, and becomes a value close to 1 for a straight edge type. At this time, each edge shape is also represented by a continuous linear variation. Further, as pixels for calculating the linear variation, pixels that are adjacent to the edge enhancement process target pixel and before and after the edge enhancement process target pixel may be used, or pixels that are adjacent to the edge enhancement process target pixel and before and after the edge enhancement process target pixel so as to be distant from the edge enhancement process target pixel by two pixels may be used.

The edge enhancement addition amount weight processing unit 103 calculates an edge enhancement adding amount for the edge enhancement addition amount that is to be added to the edge enhancement process target pixel, from the linear variation at the edge enhancement process target pixel P2, and outputs the edge enhancement adding amount to the edge enhancement addition amount addition unit 104.

The edge enhancement adding amount is proportional to an enhancement parameter as described later. As illustrated in FIG. 9, when the edge shape is the stepped edge type for which the linear variation is close to 0, the enhancement parameter for the edge enhancement adding amount for the edge enhancement addition amount is relatively small. When the edge shape is the protrusive edge type for which the linear variation is close to −1, the enhancement parameter for the edge enhancement adding amount for the edge enhancement addition amount is relatively great as compared to that in the case of the stepped edge type. When the edge shape is the straight edge type for which the linear variation is close to 1, the enhancement parameter for the edge enhancement adding amount for the edge enhancement addition amount is relatively great as compared to that in the case of the protrusive edge type.

Figure 10:
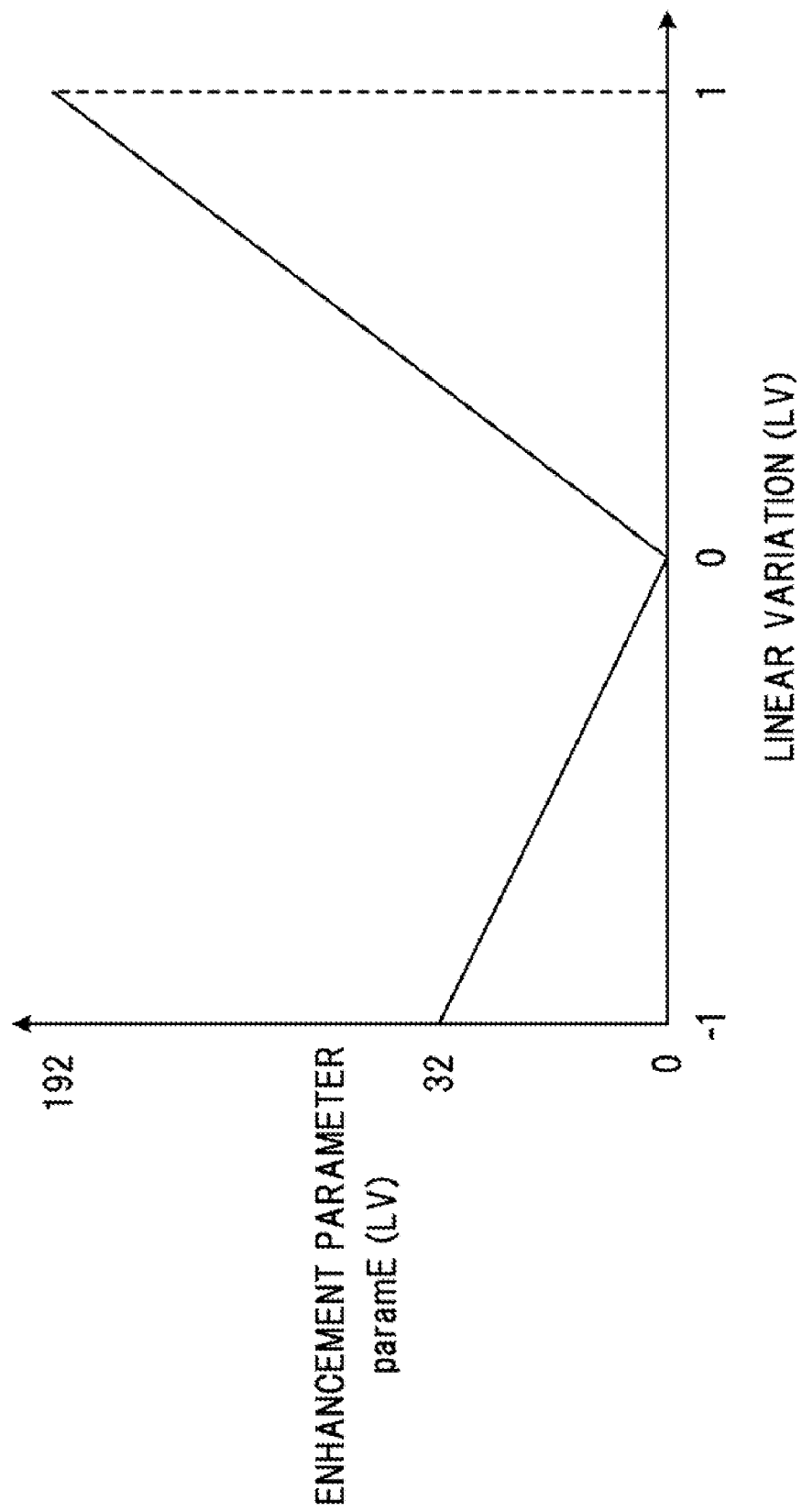
FIG. 10 illustrates an example of the relation between the linear variation and the enhancement parameter.

FIG. 10 illustrates an example of the relation between a linear variation and an enhancement parameter that are calculated in image processing according to the first embodiment. The enhancement parameter is a weighting amount that is used when calculating an edge enhancement adding amount WEn that is to be added to the edge enhancement addition amount that is to be added to the edge enhancement process target pixel.

As illustrated in FIG. 10, an enhancement parameter paramE(LV) is a function of the linear variation LV. The enhancement parameter paramE(LV) is represented by Formulas (12) and (13). The relation between the linear variation LV and the enhancement parameter paramE(LV), which is illustrated in FIG. 10, is merely one example. The edge enhancement addition amount weight processing unit 103 calculates the edge enhancement adding amount WEn based on Formula (11) by using the enhancement parameter paramE(LV).

$$WEn = \frac{En \times paramE(LV)}{256} \quad (11)$$

$$\text{Where } paramE(LV) = \begin{cases} -32LV & (-1 \le LV \le 0) \\ 192LV & (0 \le LV \le 1). \end{cases} \quad (12)$$
$$\quad (13)$$

The edge enhancement addition amount addition unit 104 outputs, to the exterior, an output pixel value Pout that is obtained by adding the edge enhancement adding amount WEn outputted from the edge enhancement addition amount weight processing unit 103 to a pixel value Pin of the edge enhancement process target pixel as illustrated in Formula (14).

$$Pout = Pin + WEn \quad (14)$$

FIG. 11 is a flow chart illustrating a procedure of the image processing according to the first embodiment. As illustrated in FIG. 11, the edge enhancement addition amount calculation unit 101 calculates an edge enhancement addition amount from an edge enhancement process target pixel and the adjacent pixels (at S101). Specifically, the edge enhancement addition amount calculation unit 101 calculates the edge enhancement addition amount by using the above Formula (1) or the above Formulas (2) to (7).

The linear variation calculation unit 102 calculates a linear variation from the edge enhancement process target pixel and the adjacent pixels (at S102). Specifically, the linear variation calculation unit 102 calculates the linear variation by using the above Formulas (8) and (9).

The edge enhancement addition amount weight processing unit 103 calculates an enhancement parameter (weighting amount) for an edge enhancement addition amount from the linear variation of the edge enhancement process target pixel, and calculates an edge enhancement adding amount based on the enhancement parameter (at S103). Specifically, the edge enhancement addition amount weight processing unit 103 calculates the edge enhancement adding amount by using the above Formulas (10) and (11).

The edge enhancement addition amount addition unit 104 calculates an output pixel value Pout that is obtained by adding the edge enhancement adding amount WEn to the pixel value Pin of the edge enhancement process target pixel (at S104). Specifically, the edge enhancement addition amount addition unit 104 calculates the output pixel value Pout by using the above Formula (14). When this process ends, the image processing ends.

In the embodiment, by changing the weight (enhancement parameter) for the edge enhancement adding amount in accordance with the linear variation as described above, the edge gradient is steepened at the protrusive edge type and at the straight edge type while suppressing image degradation that is caused by overshoot that is likely to occur at the stepped edge type, thereby improving the sharpness of an image.

(Second Embodiment)

The following will describe a second embodiment. In the second embodiment, an edge intensity (the absolute value of an edge gradient) is taken into consideration when calculating the edge enhancement adding amount WEn in the first embodiment. As to the description of the second embodiment, only the difference with the first embodiment will be described, and the description concerning elements assigned with the same reference numerals as in the first embodiment, and processes assigned with the same step numerals as in the first embodiment is omitted.

FIG. 12 is a block diagram illustrating a configuration of an image processing/output apparatus according to the second embodiment. The image processing/output apparatus 100b according to the second embodiment is an image processing/output apparatus in which an edge intensity calculation unit 105 is added to the image processing/output apparatus 100a according to the first embodiment.

Figures 13A, 13B:
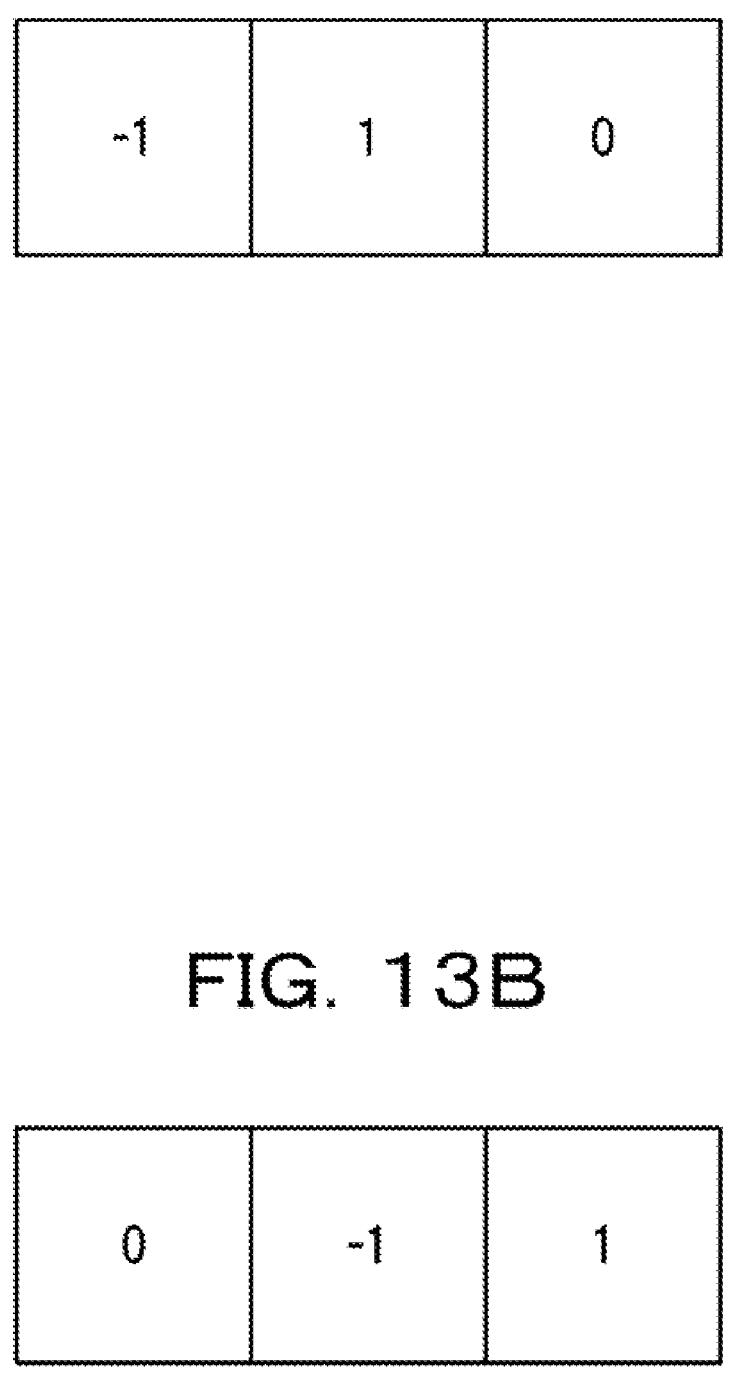

The edge intensity calculation unit 105 calculates an edge intensity EP based on Formulas (15) to (17) by using edge enhancement calculation filters illustrated in FIGS. 13A and 13B from the pixel values of three pixels (pixel P1, pixel P2, and pixel P3) that are adjacent to each other in an input image with the edge enhancement process target pixel P2 being located at the center. In other words, a greater value among the absolute value of an edge intensity EP1 calculated by using the edge enhancement calculation filter illustrated in FIG.

13A and the absolute value of an edge intensity EP2 calculated by using the edge enhancement calculation filter illustrated in FIG. 13B, is regarded as the edge intensity EP.

$$EP=\max(EP1,EP2) \quad (15)$$

$$\text{Where } EP1=|(-1) \times p1 + 1 \times p2| \quad (16),$$

$$\text{and } EP2=|(-1) \times p2 + 1 \times p3| \quad (17).$$

When the linear variation LV calculated by the linear variation calculation unit 102 is equal to or more than 0, the edge enhancement addition amount weight processing unit 103 calculates an edge enhancement adding amount WEn by using Formula (18) similarly as in the first embodiment. When the linear variation LV calculated by the linear variation calculation unit 102 is less than 0, the edge enhancement addition amount weight processing unit 103 calculates an edge enhancement adding amount WEn by using Formula (19) incorporating an edge intensity parameter paramEP(EP), having the edge intensity EP as a variable, into an edge enhancement adding amount that is the same as in the first embodiment.

$$WEn = \begin{cases} En \times \dfrac{paramE(LV)}{256} & (LV \geq 0) \quad (18) \\ En \times \dfrac{paramE(LV)}{256} \times \dfrac{paramEP(EP)}{256} & (LV < 0) \quad (19) \end{cases}$$

$$\text{When } paramE(LV) = \begin{cases} -32LV & (-1 \leq LV < 0) \quad (20) \\ 192LV & (0 \leq LV \leq 1) \quad (21) \end{cases}$$

$$paramEP(EP) = \begin{cases} 0 & (0 \leq EP < 8 \text{ or } 32 \leq EP) \quad (22) \\ 32EP - 256 & (8 \leq EP < 16) \quad (23) \\ 256 & (16 \leq EP < 24) \quad (24) \\ -32EP + 1024 & (24 \leq EP < 32). \quad (25) \end{cases}$$

Figure 14:
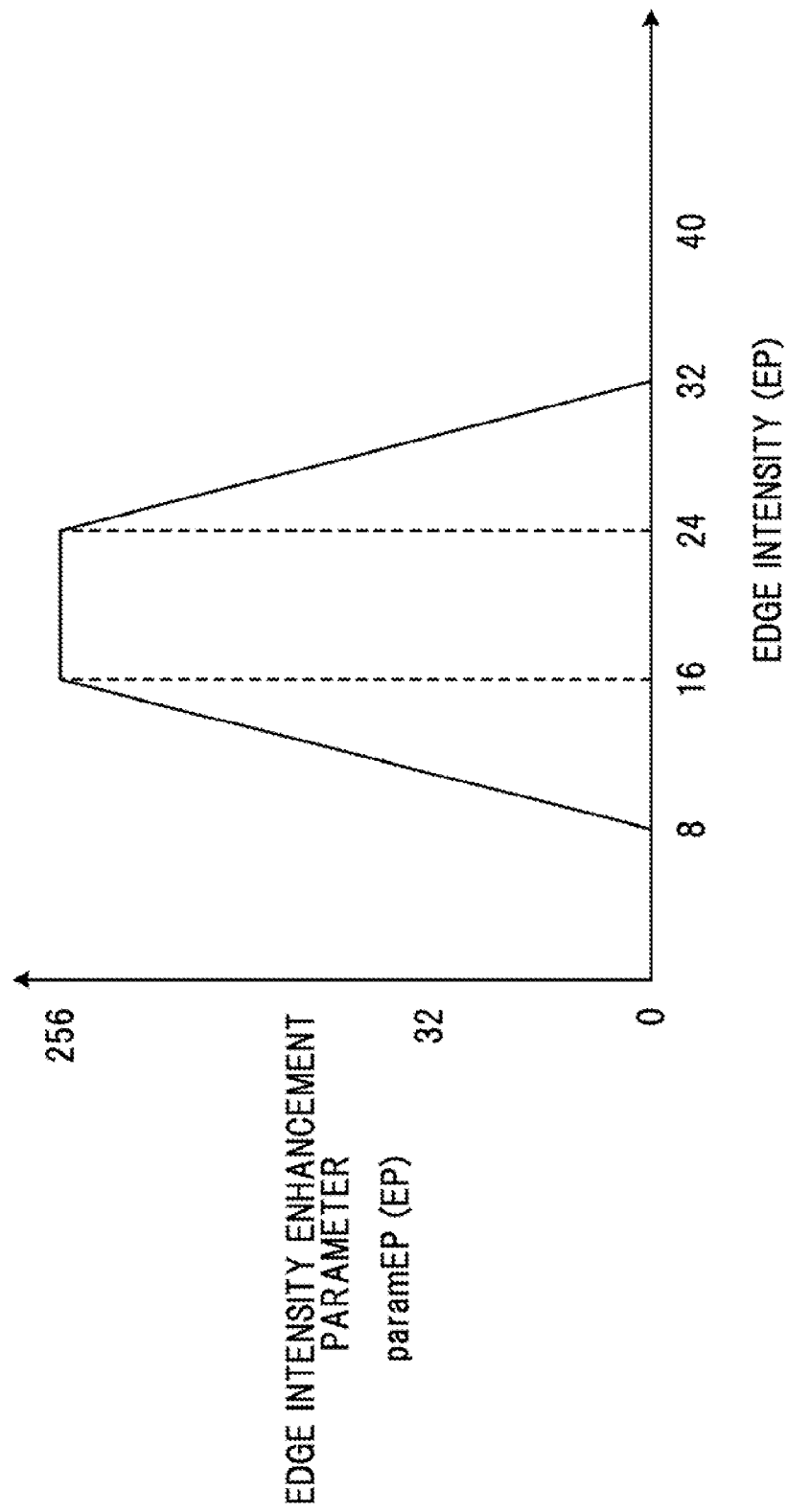
FIG. 14 illustrates an example of the relation between an edge intensity and an edge intensity enhancement parameter.

It is noted that the edge intensity parameter paramEP(EP) is calculated based on Formulas (22) to (25). The relation between the edge intensity EP and the edge intensity parameter paramEP(EP) is represented as a quadrilateral (trapezoid) that has line symmetry about a line at an edge intensity EP of 20, as illustrated in FIG. 14. The relation between the edge intensity EP and the edge intensity parameter paramEP (EP), which is illustrated in FIG. 14, is merely one example. It is noted that, in the case of the above Formula (19), the edge enhancement adding amount is proportional to the enhancement parameter and the edge intensity enhancement parameter.

FIG. 15 is a flow chart illustrating a procedure of image processing according to the second embodiment. As illustrated in FIG. 15, the procedure of the image processing according to the second embodiment differs from the procedure of the image processing according to the first embodiment in that the process at S102 is followed by processes at S102a and S103a, proceeding to a process at S104.

The edge intensity calculation unit 105 calculates an edge intensity from an edge enhancement process target pixel and adjacent pixels (at S102a). Specifically, the edge intensity calculation unit 105 calculates the edge intensity by using the above Formulas (15) to (17).

The edge enhancement addition amount weight processing unit 103 calculates an enhancement parameter and an edge intensity enhancement parameter for an edge enhancement addition amount from the linear variation and the edge intensity of the edge enhancement process target pixel (at S103a). The enhancement parameter for the edge enhancement addition amount is calculated based on the linear variation. The edge enhancement addition amount weight processing unit 103 calculates an edge enhancement adding amount based on the enhancement parameter and the edge intensity enhancement parameter. Specifically, the edge enhancement addition amount weight processing unit 103 calculates the edge enhancement adding amount by using the above Formulas (18) to (25). When this process ends, the processing proceeds to the process at S104.

As described above, in the second embodiment, occurrence of overshoot at a stepped edge and enhancement of noise that is the protrusive edge type having a small amplitude, are suppressed. In addition, in the second embodiment, an edge enhancement amount is suppressed in a region where an edge intensity is relatively small (a region at or adjacent to an edge intensity EP of 8 in FIG. 14) and in a region where an edge intensity is relatively great (a region at or adjacent to an edge intensity EP of 32 in FIG. 14).

The embodiments of the invention have been described above, but the invention is not limited thereto and may be practiced in various different embodiments within the scope of the technical idea described in the claims. In addition, the effects of the invention are not limited to the effects described in the embodiments.

Further, of the processes described in the above embodiments, all or some of the processes described as being performed automatically may be performed manually. In addition, of the processes described in the above embodiments, all or some of the processes described as being performed manually may be performed automatically. The processing procedures, the control procedures, the specific names, and information including various data and parameters, which are described in the above embodiments, may be changed optionally, except the specified cases.

Further, each component of each apparatus described in the above embodiments is functionally conceptual, and does not need to be physically configured as illustrated in the drawings. In other words, the specific mode of dispersion and integration of each apparatus is not limited to the illustrated mode of dispersion and integration, and all or a part thereof may be functionally or physically dispersed or integrated in an optional unit according to various types of loads and the state of use.

Further, all or some of the processing functions performed by each apparatus are implemented by a program that is analyzed and executed by a microcomputer such as a CPU (Central Processing Unit), an MPU (Micro Processing Unit), and/or an MCU (Micro Controller Unit). In addition, each processing function may be implemented by a hardware using wired-logic.

It is noted that an executable code of a program that implements each processing function performed by each apparatus may be recorded in various recording media and distributed. In addition, the executable code of the program may be capable of being distributed via an electric communication line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image output apparatus comprising:
an addition amount calculation unit that calculates, based on a target pixel and each of adjacent pixels before and after the target pixel in an input image, an edge enhancement addition amount to be added to a pixel value of the target pixel;
a variation calculation unit that calculates a linear variation in accordance with a shape of an edge gradient formed by the target pixel and each of the adjacent pixels;
a weight processing unit that assigns a weight to the edge enhancement addition amount in accordance with the linear variation; and
an addition amount addition unit that adds the weighted edge enhancement addition amount to the pixel value of the target pixel and outputs the added pixel value.

2. The image output apparatus according to claim 1, further comprising:
an edge intensity calculation unit that calculates an edge intensity that indicates a magnitude of the edge gradient, based on the target pixel and each of the adjacent pixels,
wherein the weight processing unit assigns a weight to the edge enhancement addition amount in accordance with the linear variation and the edge intensity.

3. The image output apparatus according to claim 1, wherein the variation calculation unit:
determines that the shape of the edge gradient is a first edge type, when at least either an absolute value of indicating magnitude of a first edge gradient formed by the target pixel and the adjacent pixel before the target pixel and an absolute value of indicating magnitude of a second edge gradient formed by the target pixel and the adjacent pixel after the target pixel is less than a positive number;
determines that the shape of the edge gradient is a second edge type, when a first edge gradient sign and a second edge gradient sign are different from each other and a difference between absolute values indicating magnitudes of the first edge gradient and the second edge gradient, respectively, is less than a positive number; and
determines that the shape of the edge gradient is a third edge type, when the first edge gradient sign and the second edge gradient sign are the same and the difference between the absolute values indicating the magnitudes of the first edge gradient and the second edge gradient, respectively, is less than a positive number; and wherein
the linear variation continuously changes between the second edge type and the first edge type and between the first edge type and the third edge type in accordance with a magnitude relation between the absolute values of the first edge gradient and the second edge gradient,
the weight processing unit assigns a weight to the first edge type, a weight greater than the weight of the first edge type to the second edge type and a weight greater than the weight of the second edge type to the third edge type, and
the edge enhancement addition amount continuously changes between the second edge type and the first edge type and between the first edge type and the third edge type by the weight assigning.

4. The image output apparatus according to claim 1, wherein the addition amount calculation unit calculates, as the edge enhancement addition amount, a value that is obtained by inverting the sign of a secondary differential value of the target pixel.

5. An edge enhancement method executed by an edge enhancement apparatus, the method comprising:
calculating an edge enhancement addition amount, based on a target pixel and each of adjacent pixels before and after the target pixel in an input image, to be added to a first pixel value of the target pixel;
calculating a linear variation in accordance with a shape of an edge gradient that is formed by the target pixel and each of the adjacent pixels;
assigning a weight to the edge enhancement addition amount in accordance with the linear variation; and
adding the weighted edge enhancement addition amount to the first pixel value of the target pixel to create a second pixel value and outputting the second pixel value.

6. The edge enhancement method according to claim 5, further comprising:
calculating an edge intensity that indicates a magnitude of the edge gradient, based on the target pixel and each of the adjacent pixels,
wherein the weight assigning assigns a weight to the edge enhancement addition amount in accordance with at least one of the linear variation and the edge intensity.

7. The edge enhancement method according to claim 5, wherein the linear variation calculating:
determines that the shape of the edge gradient is a first edge type, when at least either an absolute value indicating magnitude of a first edge gradient formed by the target pixel and the adjacent pixel before the target pixel or an absolute value indicating magnitude of a second edge gradient formed by the target pixel and the adjacent pixel after the target pixel is less than a positive number;
determines that the shape of the edge gradient is a second edge type, when a first edge gradient sign and a second edge gradient sign are different from each other and a difference between absolute values indicating magnitudes of the first edge gradient and the second edge gradient, respectively, is less than a positive number; and
determines that the shape of the edge gradient is a third edge type, when the first edge gradient sign and the second edge gradient sign are the same and the difference between the absolute values indicating the magnitudes of the first edge gradient and the second edge gradient, respectively, is less than a positive number,
the linear variation continuously changes between the second edge type and the first edge type and between the first edge type and the third edge type in accordance with a magnitude relation between the absolute values of the first edge gradient and the second edge gradient,
the weight assigning assigns a weight to the first edge type, a weight greater than the weight of the first edge type to the second edge type and a weight greater than the weight of the second edge type to the third edge type, and
the edge enhancement addition amount continuously changes between the second edge type and the first edge type and between the first edge type and the third edge type by the weight assigning.

8. The edge enhancement method according to claim 5, wherein the addition amount calculating calculates, as the edge enhancement addition amount, a value that is obtained by inverting a sign of a secondary differential value of the target pixel.

9. A non-transitory computer-readable medium having recorded therein a program that causes an image-related apparatus to execute a method when the program is executed by the image-related apparatus, the method comprising:

calculating an edge enhancement addition amount based on a target pixel and each of adjacent pixels before and after the target pixel in an input image, the edge enhancement addition amount is to be added to a first pixel value of the target pixel;

calculating a linear variation in accordance with a shape of an edge gradient that is formed by the target pixel and each of the adjacent pixels;

assigning a weight to the edge enhancement addition amount in accordance with the linear variation; and adding the weighted edge enhancement addition amount to the first pixel value of the target pixel to create a second pixel value and outputting the second pixel value.

10. The non-transitory computer-readable medium according to claim 9, wherein the method further comprises:

calculating an edge intensity based on the target pixel and each of the adjacent pixels, the edge intensity indicating a magnitude of the edge gradient, wherein the weight processing assigns a weight to the edge enhancement addition amount in accordance with at least one of the linear variation and the edge intensity.

11. The non-transitory computer-readable medium according to claim 9, wherein the linear variation calculating:

determines that the shape of the edge gradient is a first edge type, when at least either an absolute value indicating magnitude of a first edge gradient formed by the target pixel and the adjacent pixel before the target pixel, and an absolute value indicating magnitude of a second edge gradient formed by the target pixel and the adjacent pixel after the target pixel is less than a positive number;

determines that the shape of the edge gradient is a second edge type, when a first edge gradient sign and a second edge gradient sign are different from each other and a difference between absolute values indicating magnitudes of the first edge gradient and the second edge gradient, respectively, is less than a positive number; and determines that the shape of the edge gradient is a third edge type, when the first edge gradient sign and the second edge gradient sign are the same and the difference between the absolute values indicating the magnitudes of the first edge gradient and the second edge gradient, respectively, is less than a positive number, the linear variation continuously changes between the second edge type and the first edge type and between the first edge type and the third edge type in accordance with a magnitude relation between the absolute values of the first edge gradient and the second edge gradient, the weight assigning assigns a weight to the first edge type, a weight greater than the weight of the first edge type to the second edge type and a weight greater than the weight of the second edge type to the third edge type, and the edge enhancement addition amount continuously changes between the second edge type and the first edge type and between the first edge type and the third edge type by the weight assigning.

12. The non-transitory computer-readable medium according to claim 9, wherein the addition amount calculating calculates, as the edge enhancement addition amount, a value that is obtained by inverting a sign of a secondary differential value of the target pixel.

* * * * *